US012732296B2

(12) United States Patent
Juarez et al.

(10) Patent No.: US 12,732,296 B2
(45) Date of Patent: Sep. 8, 2026

(54) MULTI-WAVELENGTH PHASE STABILIZATION

(71) Applicant: General Dynamics Mission Systems, Inc., Fairfax, VA (US)

(72) Inventors: Juan C. Juarez, Ellicott City, MD (US); Claudia Ann Gamble, Annapolis, MD (US); John Anthony Gariano, Chandler, AZ (US); Jerry Kwa-Wor Tong, Chandler, AZ (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 254 days.

(21) Appl. No.: 18/754,414

(22) Filed: Jun. 26, 2024

(65) Prior Publication Data

US 2026/0003213 A1 Jan. 1, 2026

(51) Int. Cl.
*H04J 14/02* (2006.01)
*G02F 1/21* (2006.01)

(52) U.S. Cl.
CPC ................ *H04J 14/02* (2013.01); *G02F 1/21* (2013.01); *G02F 2203/50* (2013.01)

(58) Field of Classification Search
CPC ......... H04J 14/02; G02F 1/21; G02F 2203/50
USPC ........................................................... 398/78
See application file for complete search history.

(56) References Cited

U.S. PATENT DOCUMENTS 6,014,237 A * 1/2000 Abeles ............... H04Q 11/0005 372/18
2003/0058504 A1* 3/2003 Cho ................... H04B 10/2543 398/147
2007/0165679 A1* 7/2007 Kagawa .................. H04J 14/08 370/503
2015/0016827 A1* 1/2015 Wilkinson .......... H04L 27/2096 398/183
2016/0282190 A1* 9/2016 Olszak ............... G01B 9/02004
2017/0346445 A1* 11/2017 Shen ..................... H04J 14/028

* cited by examiner

*Primary Examiner* — Dalzid E Singh
(74) *Attorney, Agent, or Firm* — Ingrassia Fisher & Lorenz, LLP

(57) ABSTRACT

The multi-wavelength phase stabilization system employs a broadband light source producing a continuous range of wavelengths that include the plurality of discrete optical wavelengths corresponding to the wavelengths to be stabilized. An interferometric mixing system receives the broadband light and the wavelengths to be stabilized, producing a plurality of interference patterns associated with the discrete optical wavelengths. A detecting system produces plural electrical signals based on the intensity of the interference patterns and feeds a control system which produces phase lock-in control signals based on feedback from the electrical signals. A phase shifting system driven by the control system independently adjusts each of the plural discrete optical signals to a stabilized phase, such that the plural discrete optical signals are phase-stabilized to a common reference point.

18 Claims, 2 Drawing Sheets

MULTI-WAVELENGTH PHASE STABILIZATION

TECHNICAL FIELD

The disclosure relates generally to phase stabilization in communications systems, and more particularly to phase stabilization in multi-channel optical systems.

BACKGROUND

This section provides background information related to the present disclosure which is not necessarily prior art.

Optical phase stabilization is required for many classical and quantum communications applications. Typically phase stabilization is performed on optical signals that are the same wavelength. When the communications application involves plural signals of different wavelengths phase stabilization becomes quite a bit more difficult.

One reason for this difficulty is that current phase stabilization methods often use interferometers to extract the phase information directly from the laser frequency of the optical signals themselves—as absolute phase cannot be measured. However, because these optical signals are typically of widely varying wavelength (nanometers), such interferometric approaches are limited, because the frequency difference is so large that beat tones cannot be monitored on optical detectors. Terahertz bandwidth would be required, and this is currently infeasible.

SUMMARY

The disclosed phase stabilization solution addresses the difficulty in phase-stabilizing different wavelengths. The disclosed method and apparatus will simultaneously stabilize the relative phase of optical signals of different wavelengths to each other, using a common reference point. Thus the disclosed technique focuses on stabilizing the phase of different optical frequencies, instead of stabilizing the actual laser frequency.

In the disclosed technique control signals are created by using a broadband optical source to simultaneously interfere with each different wavelength. The optical signals are nested in an interferometer where the common path is injected with a broadband source to stabilize the signals at a common reference point (interferometer output). Each wavelength is filtered to isolate the control signal, which can then be used to selectively apply a phase shift in the data carrying wavelength. The disclosed solution can be performed across several optical bands, e.g., C-band, L-band, etc.

The disclosed technique creates interferometric beat tones for multiple wavelengths by using an amplified spontaneous emission (ASE) source which interferes with each wavelength to be phase-locked. These beat tones are received, filtered and monitored on photodetectors for each wavelength. In this way, optical signals at a plurality of discrete optical wavelengths can be phase-locked to a common reference without the need to extract the phase information directly from the laser frequency of the optical signals themselves.

In accordance with one aspect, disclosed is a multi-wavelength phase stabilization system for a communication system that uses a composite data signal consisting essentially of plural discrete optical signals at a plurality of discrete optical wavelengths each having an associated initial phase. The system provides an input for receiving the composite data signal, and a broadband light source producing a continuous range of wavelengths that include the plurality of discrete optical wavelengths.

An interferometric mixing system is coupled to the broadband light source and is also coupled to receive the composite data signal. The mixing system produces a plurality of interference patterns associated with the plurality of discrete optical wavelengths. More specifically, the interferometer system is driven by a broadband light source and is comprised of two legs. The first leg acts as the common reference, while the second leg contains a phase shifting system and discrete data signal encoders for each discrete optical wavelength. The coherent sources comprising the discrete optical wavelengths is counter-propagating with respect to the broadband light source.

A detecting system is coupled to the mixing system and produces plural electrical signals based on the intensity of the plurality of interference patterns. A control system is coupled to the detecting system and is operable to produce a plurality of phase lock-in control signals based on feedback from the electrical signals.

A phase shifting system receptive of the composite data signal and controlled by the control system to independently adjust each of the plural discrete optical signals to a stabilized phase, such that the plural discrete optical signals are phase-stabilized to a common reference point.

In accordance with another aspect, disclosed is a method of stabilizing multiple wavelengths to a common reference. The method entails receiving a composite signal comprising a plurality of discrete optical signals at a plurality of discrete optical wavelengths. An interferometric mixing site is provided that is receptive of broadband light covering a range of wavelengths that include the plurality of discrete optical wavelengths. The received composite signal is introduced into the interferometric mixing site thereby producing a plurality of interference patterns associated with the plurality of discrete optical signals.

The intensity of the each of the plurality of interference patterns is individually measured to produce a plurality of electrical control signals; and the phase of each of the plurality of discrete optical signals of the composite signal is selectively and individually adjusting based on the plurality of electrical control signals to thereby stabilize the phases of the composite signal to a common reference point.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
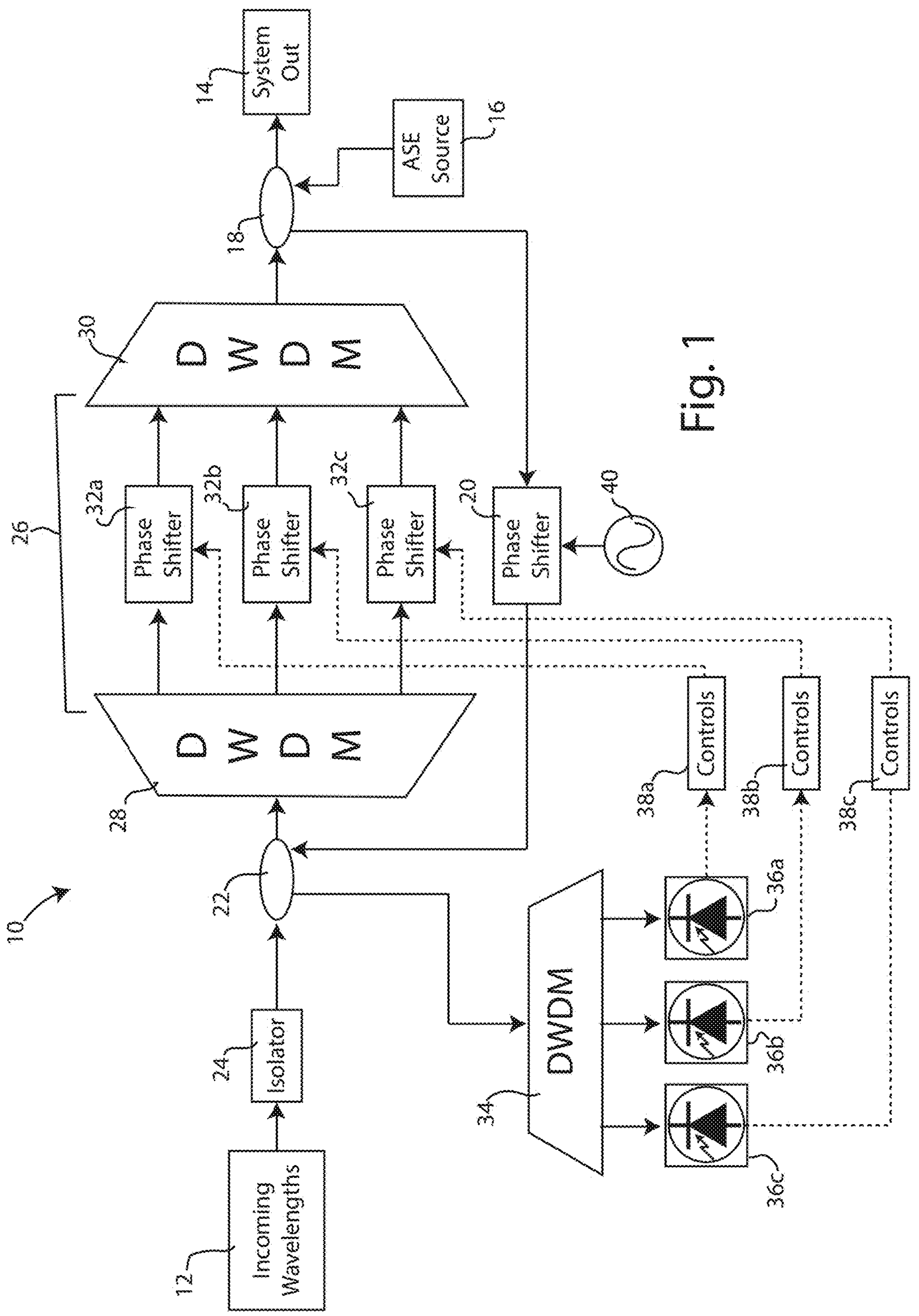
FIG. 1 is a block diagram of an optical and electronic apparatus to perform multi-wavelength phase stabilization.

A multi-wavelength phase stabilization device is shown generally at 10 in FIG. 1. The device 10 is configured to stabilize a plurality of incoming optical data-carrying wavelengths using an interferometric technique. The plural optical wavelengths may, for example, correspond to different wavelength-multiplexed optical communication signals in separate channels.

As illustrated, the plural incoming wavelengths are input at 12 and exit the device at 14. In a multi-channel system, the phase relationships of the incoming wavelengths 12 may be un-stabilized. There may be no phase correlation among the incoming signals. The purpose of stabilization device 10 is to provide phase stabilization, such that data-carrying wavelengths exiting at system output 14 are phase-stabilized to a common reference.

Figure 2:
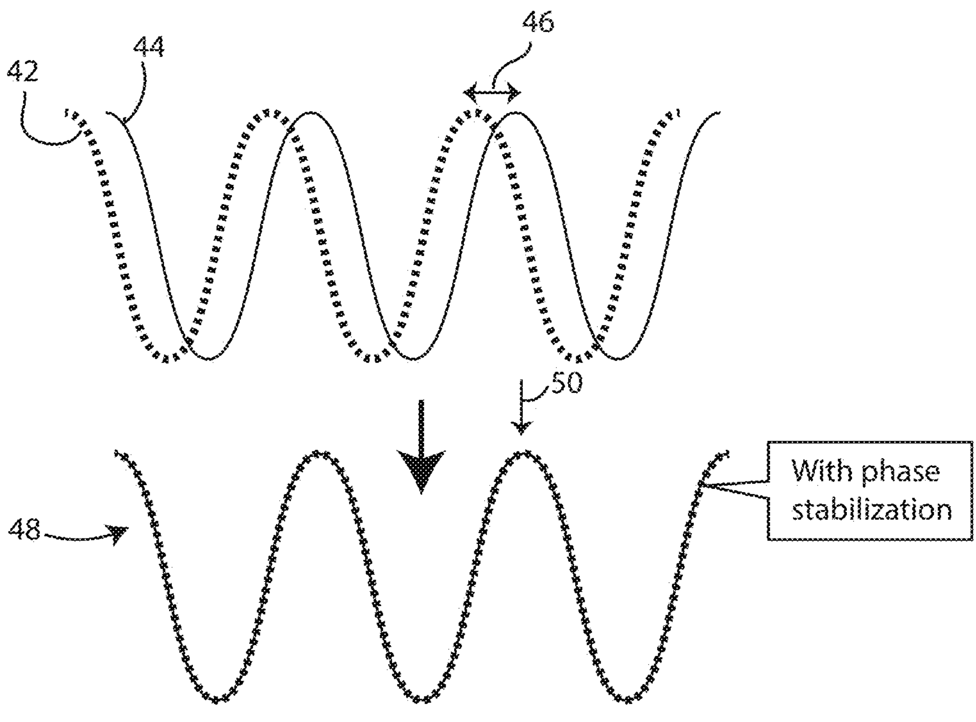
FIG. 2 is a series of waveform diagrams explaining the phase stabilization concept.

An overview of this phase stabilization concept is illustrated in FIG. 2, which shows two optical waves 42 and 44 that are slightly out of phase. FIG. 2 shows a phase difference 46 between waves 42 and 44 at 46. By operation of stabilization device 10, these two waves are made to coincide in phase as depicted at 48. Thus the phase difference has been reduced to zero, as shown at 50.

Referring to FIG. 1, the stabilization device effects stabilization control over the incoming data-carrying wavelengths by performing individual phase-shifting operations on each data-carrying wavelength, based on control signals that are created using a broadband optical source, such as an amplified spontaneous emission (ASE) source 16. Other broadband optical sources may also be used.

For this purpose broadband (multiple wavelength) light from ASE source 16 is delivered to a first optical coupler 18. This broadband light is further routed from the first optical coupler 18 to a second optical coupler 22 via phase shifter 20. The purpose of phase shifter 20 is discussed below.

Interferometric Mixing

These two optical couplers serve as interferometric mixing sites where the data-carrying wavelengths interfere with light from the broadband ASE source to produce interferometric interference fringing patterns. These interference patterns consist of bright fringes when two waves are in face (constructive interference), and dark fringes when two waves are out of phase (destructive interference). In essence, each data-carrying wavelength interferes with, or beats with, a like wavelength from the broadband light source (reference source). This produces an interferometric beat tone indicative of the degree to which the data-carrying wavelength and reference source wavelength are phase-mismatched, as demonstrated in FIG. 2.

In use each wavelength optical path should be time-of-flight matched to the other paths, as well as the common reference path, to coarsely align the signals.

Data-Carrying Wavelengths Phase Shifting

To adjust the phases of the incoming data-carrying wavelengths, the stabilization device 10 employs phase shifting system that individually applies phase shifting to each of the data-carrying wavelengths. This phase shifting system, shown generally at 26 comprises first and second dense wavelength division multiplexing (DWDM) filters 28 and 30, respectively. Between the DWDM filters 28 and 30 are a parallel set of phase shifters 32*a*-32*c*, which are each electrically controlled by control circuits 38*a*-38*c*, respectively. The pair of DWDM filters 28 and 30 separate the wavelengths, so they can be individually phase-shifted, and then recombined into a single optical stream.

The data-carrying wavelengths, input at 12, pass through isolator 24 and enter DWDM 28. (Isolator 24 is provided to prevent ASE broadband light from being injected back towards the incoming wavelengths block 12.) DWDM 28 demultiplexes the incoming data-carrying wavelengths into individual channels on the basis of wavelength. Thus as illustrated, each different data carrying wavelength is processed by its dedicated phase shifter 32*a*-32*c*).

In FIG. 1, three data-carrying channels have been illustrated, but it will be recognized that the number of channels depends on the communication system being implemented. A wider DWDM may be used to support more than three channels based on system requirements. Also, while the incoming wavelengths have been described as "data-carrying"—a condition normally expected in a communication system—the disclosed phase stabilization technique will work whether the incoming wavelengths carry data or not.

Control Signals

The individual phase shifters 32*a*-32*c* adjust the respective data carrying wavelengths based on individual control signals, which are in turn derived from the interferometric interference patterns produced by mixing with the corresponding wavelength from the ASE source. To achieve this, an output from optical coupler 22 is fed to a third dense wavelength division multiplexing (DWDM) filter 34. DWDM 34 demultiplexes the output optical coupler 22 into the same plural wavelength bands or channels as DWDM 28.

The output of DWDM 34 supplies these plural wavelengths to respective optical detectors 36*a*-36*c*, which produce electrical signals (shown in dotted lines) corresponding to the intensity of each individual interference pattern (beat tone). These intensity signals are fed to individual control systems 38*a*-38*c*, which are configured to effect a control architecture utilizing a lock-in detection proportional, integral and derivative (PID) controller approach, with feedback from the beat tones. These controllers 38*a*-38*c* provide electrical control signals (shown in dotted lines) to the respective phase shifters 32*a*-32*c*.

The control architecture relies on dithering to provide an error signal for the lock-in amplifier. Dithering is produced by feeding the broadband optical reference source (supplied by the ASE source 16 via optical coupler 18) through phase shifter 20. Phase shifter 20 applies a phase dither to the optical reference source based on oscillator 40.

Dithering of the reference source provides an error signal for the lock-in amplifier that is proportional to the phase offset from the maximum (or minimum) of the interference fringes. In the preferred embodiment the controllers are configured to lock to the maximum to maximize the power output of the system.

Figure 3:
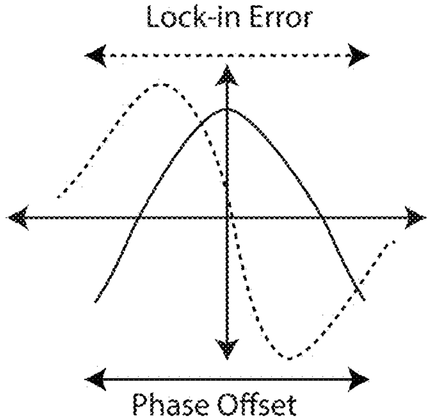
FIG. 3 is a waveform diagram comparing lock-in error vs phase offset from maximum.

Lock-in detection essentially provides the derivative as the error signal. Thus at a peak or null the error signal is 0 (zero). The PIF controller drives to maintain a 0-error setpoint (zero-error setpoint). With reference to FIG. 3, the phase offset is depicted in solid line and the lock-in error is shown in dotted line. As illustrated, the lock-in error is 0 (zero) where the phase offset signal is at its maximum.

Advantages and Use Cases

The disclosed technique overcomes the effects of differential path length fluctuations (phase changes) and allows separate data encoding across the channels (different wavelengths) Because the beat tone is derived through interference with a common reference source, commercially available photodetectors may be used. Thus the phase stabilization control system does not require very high-speed electronics and can be realized with typical commercially available instruments.

The disclosed solution is scalable throughout the chosen optical band.

The disclosed phase stabilization apparatus and method can be deployed in commercial fiber communication and sensor systems, to allow migration to higher channel count (i.e., more wavelengths). Other applications for the disclosed technology may be found in coherent receivers, demodulation of phase modulated signals and phase sensitive amplification.

The disclosed system can be particularly advantageous in quantum applications and quantum-augmented classical systems. Quantum processes, in general, are often phase sensitive, so control of optical phase is a necessity. Thus the disclosed phase stabilization technique can be advantageously utilized in systems which include quantum-encoded information, where quantum entangled photons are present in the optical stream.

In the illustrated embodiment of FIG. 1, the data-carrying optical signal(s) flow left to right, illustrating a use case where the data-carrying signals are input at 12 and exit in a phase-stabilized state at 14. The embodiment of FIG. 1 is bidirectional also capable of supporting signal flow from right to left.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment

The invention claimed is:

1. A multi-wavelength phase stabilization system for a communication system that uses a composite data signal consisting essentially of plural discrete optical signals at a plurality of discrete optical wavelengths each having an associated initial phase, comprising:

an input for receiving the composite data signal;

a broadband light source producing a range of wavelengths that include the plurality of discrete optical wavelengths;

an interferometric mixing system coupled to the broadband light source and also coupled to receive the composite data signal, the mixing system producing a plurality of interference patterns associated with the plurality of discrete optical wavelengths;

a detecting system coupled to the mixing system and producing plural electrical signals based on the intensity of the plurality of interference patterns;

a control system coupled to the detecting system and operable to produce a plurality of phase lock-in control signals based on feedback from the electrical signals;

a phase shifting system receptive of the composite data signal and controlled by the control system to independently adjust each of the plural discrete optical signals to a stabilized phase, such that the plural discrete optical signals are phase-stabilized to a common reference point.

2. The system of claim 1 wherein the broadband light source is an amplified spontaneous emission source.

3. The system of claim 1 wherein the interferometric mixing system is implemented using an optical coupler having a first input receptive of broadband light from the broadband light source and a second input receptive of the plural discrete optical signals.

4. The system of claim 1 wherein the detecting system comprises a plurality of photodetectors.

5. The system of claim 1 wherein the detecting system comprises:

a control wavelength division multiplexer having an input collectively receptive of plural beat tone signals corresponding to the plurality of interference patterns associated with the plurality of discrete optical wavelengths, and having a plurality of outputs each carrying a different one of the plural beat tone signals; and a plurality of photodetectors each measuring a different one of the plurality of outputs of the wavelength division multiplexer.

6. The system of claim 1 wherein the control system implements lock-in detection using a proportional, integral and derivative control algorithm.

7. The system of claim 1 wherein the phase shifting system comprises:

a first wavelength division multiplexer having an input coupled to the interferometric mixing system and a plurality of outputs;

a second wavelength division multiplexer having a plurality of inputs and an output;

a plurality of phase shifters each one being interposed between a different one of the plurality of outputs of the first wavelength division multiplexer and a different one of the plurality of inputs of the second wavelength division multiplexer;

wherein the plurality of phase shifters are each controlled by the control system.

8. The system of claim 1 further comprising a broadband phase shifter that introduces phase dither of the range of wavelengths produced by the broadband light source.

9. The system of claim 8 further comprising a sinusoidal signal generator controlling the broadband phase shifter.

10. A method of stabilizing multiple wavelengths to a common reference comprising:

receiving a composite signal comprising a plurality of discrete optical signals at a plurality of discrete optical wavelengths;

providing an interferometric mixing site receptive of broadband light covering a range of wavelengths that include the plurality of discrete optical wavelengths;

introducing the received composite signal into the interferometric mixing site and thereby producing a plurality of interference patterns associated with the plurality of discrete optical signals;

individually measuring the intensity of the each of the plurality of interference patterns to produce a plurality of electrical control signals; and selectively and individually adjusting the phase of each of the plurality of discrete optical signals of the composite signal based on the plurality of electrical control signals to thereby stabilize the phases of the composite signal to a common reference point.

11. The method of claim 10 wherein the broadband light is provided using an amplified spontaneous emission source.

12. The method of claim 10 wherein the provided interferometric mixing site is an optical coupler receptive of the broadband light further receptive of the plurality of discrete optical signals.

13. The method of claim 10 wherein the step of individually measuring is performed using a plurality of photodetectors.

14. The method of claim 10 wherein the plurality of interference patterns have corresponding beat tones and wherein the step of individually measuring is performed by demultiplexing the beat tones into separate beat tone signals corresponding to each of the discrete optical signals and using a plurality of photodetectors to individually measure the intensity of each of the separate beat tone signals.

15. The method of claim 14 further comprising obtaining electrical control signals from the plurality of photodetectors and modifying the electrical control signals using a proportional, integral and derivative control algorithm.

16. The method of claim 10 wherein the step of adjusting the phase of each of the plurality of discrete optical signals of the composite signal is performed by:

demultiplexing the composite signal into individual signals, selectively and individually adjusting the phase of each individual signal to produce a plurality of phase adjusted signals; and multiplexing the phase adjusted signals to define a phase-stabilized composite signal.

17. The method of claim 10 further comprising introducing phase dither into the broadband light source.

18. The method of claim 10 further comprising introducing a sinusoidal phase dither into the broadband light source.

* * * * *